(12) United States Patent
DeMartino et al.

(10) Patent No.: US 10,239,778 B2
(45) Date of Patent: Mar. 26, 2019

(54) APPARATUS AND METHOD FOR SEVERING A GLASS SHEET

(71) Applicant: CORNING INCORPORATED, Corning, NY (US)

(72) Inventors: Steven Edward DeMartino, Painted Post, NY (US); David Alan Deneka, Corning, NY (US); Aniello M. Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 257 days.

(21) Appl. No.: 15/101,122

(22) PCT Filed: Nov. 26, 2014

(86) PCT No.: PCT/US2014/067604
§ 371 (c)(1),
(2) Date: Jun. 2, 2016

(87) PCT Pub. No.: WO2015/084668
PCT Pub. Date: Jun. 11, 2015

(65) Prior Publication Data
US 2016/0297705 A1     Oct. 13, 2016

Related U.S. Application Data

(60) Provisional application No. 61/911,111, filed on Dec. 3, 2013.

(51) Int. Cl.
*C03B 33/07*     (2006.01)
*C03B 33/09*     (2006.01)
(Continued)

(52) U.S. Cl.
CPC ............ *C03B 33/076* (2013.01); *C03B 21/02* (2013.01); *C03B 21/04* (2013.01); *C03B 21/06* (2013.01); *C03B 33/0215* (2013.01); *C03B 33/09* (2013.01)

(58) Field of Classification Search
CPC ... C03B 33/076; C03B 33/0215; C03B 33/09; C03B 21/02; C03B 21/04; C03B 21/06
See application file for complete search history.

(56) References Cited

U.S. PATENT DOCUMENTS 1,731,820 A    10/1929   Lewis
1,887,974 A    11/1932   Barrow
(Continued)

FOREIGN PATENT DOCUMENTS

CN     100594191 C    3/2010
EP     0321838 A1     6/1989
(Continued)

OTHER PUBLICATIONS

International Search Report and Written Opinion, dated Mar. 18, 2015, pp. 1-14, International Application No. PCT/US2014/067604, International filing dated Nov. 26, 2014, European Patent Office, The Netherlands.

*Primary Examiner* — Queenie S Dehghan

(57) ABSTRACT

A method for severing a glass sheet includes preferentially heating a region of the glass sheet to form a softened region. A slit is formed in the softened region of the glass sheet to form a slit region. The slit extends at least partially into a thickness of the glass sheet. Heat is preferentially applied to the slit region of the glass sheet.

14 Claims, 6 Drawing Sheets

(51) Int. Cl.
*C03B 33/02* (2006.01)
*C03B 21/02* (2006.01)
*C03B 21/04* (2006.01)
*C03B 21/06* (2006.01)

(56) References Cited

U.S. PATENT DOCUMENTS

| | | |
|---|---|---|
| 2,022,466 A | 11/1935 | Hess |
| 3,582,454 A | 6/1971 | Giffen |
| 3,737,294 A | 6/1973 | Dumbaugh, Jr. et al. |
| 3,756,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,214,886 A | 7/1980 | Shay et al. |
| 4,749,400 A | 6/1988 | Mouly et al. |
| 4,828,900 A | 5/1989 | Mouly |
| 5,342,426 A | 8/1994 | Dumbaugh, Jr. |
| 5,559,060 A | 9/1996 | Dumbaugh, Jr. et al. |
| 7,201,965 B2 | 4/2007 | Gulati et al. |
| 7,514,149 B2 | 4/2009 | Bocko et al. |
| 8,007,913 B2 | 8/2011 | Coppola et al. |
| 2007/0140311 A1 | 6/2007 | House et al. |
| 2010/0210442 A1 | 8/2010 | Abramov et al. |
| 2010/0294748 A1* | 11/2010 | Garner ............... C03B 33/0215 219/121.72 |
| 2011/0250423 A1 | 10/2011 | Fukasawa et al. |
| 2011/0298730 A1 | 12/2011 | Hong et al. |
| 2012/0024928 A1 | 2/2012 | Matsumoto et al. |
| 2012/0131962 A1 | 5/2012 | Mitsugi et al. |
| 2014/0138420 A1 | 5/2014 | Peng et al. |

FOREIGN PATENT DOCUMENTS

| | | |
|---|---|---|
| EP | 0633867 B1 | 8/1996 |
| EP | 1323681 A3 | 7/2003 |
| EP | 2177482 B1 | 3/2011 |
| EP | 1577273 B1 | 1/2012 |
| GB | 1366639 A | 9/1974 |
| JP | 2000290031 A | 10/2000 |
| JP | 2010037140 A | 2/2010 |
| JP | 04839007 B2 | 12/2011 |
| JP | 2013216546 A | 10/2013 |
| JP | 2014073961 A | 4/2014 |
| KR | 2014012957 A | 2/2014 |
| TW | 201226345 A | 7/2012 |
| WO | 1993020015 A1 | 10/1993 |
| WO | 20120158232 A2 | 11/2012 |
| WO | 2012165864 A2 | 12/2012 |
| WO | 2013082360 A1 | 6/2013 |
| WO | 2013085117 A1 | 6/2013 |

* cited by examiner

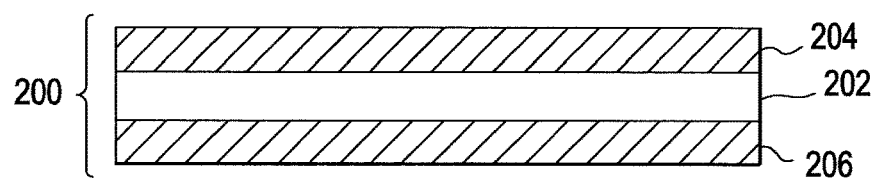
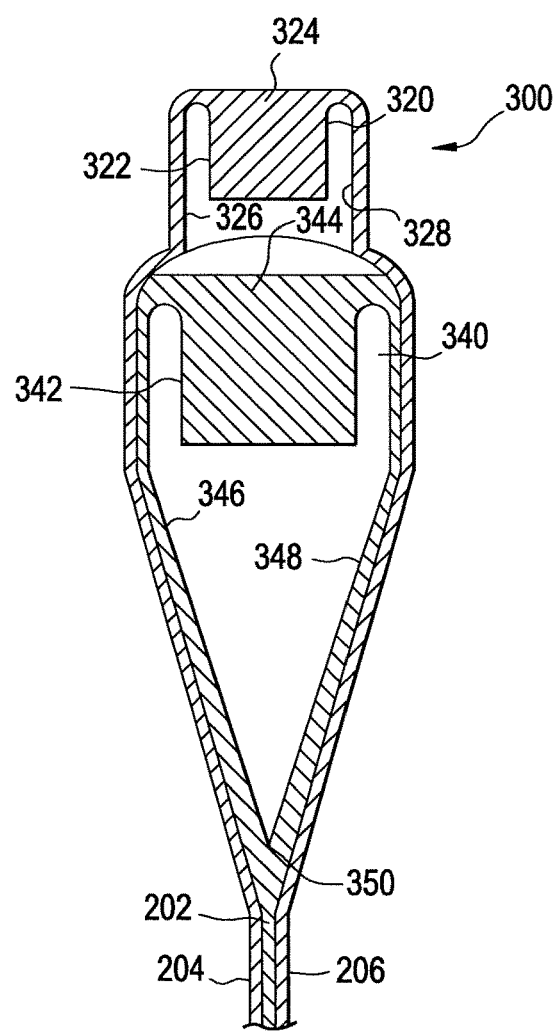

APPARATUS AND METHOD FOR SEVERING A GLASS SHEET

This application claims the benefit of priority under 35 U.S.C. § 371 of International Application No. PCT/US2014/067604, filed on Nov. 26, 2014, which claims the benefit of priority under 35 U.S.C. § 119 to U.S. Provisional Application No. 61/911,111, filed on Dec. 3, 2013, the content of each of which is relied upon and incorporated herein by reference in its entirety.

BACKGROUND

1. Field

This disclosure relates to glass sheets, and more particularly to an apparatus and method for severing a glass sheet.

2. Technical Background

A glass sheet may be formed using a variety of different processes. During or after formation, the glass sheet may be cut to a particular size and shape as part of forming a glass article from the cut glass sheet.

SUMMARY

In one embodiment, a method for severing a glass sheet comprises preferentially heating a region of the glass sheet to form a softened region. A slit is formed in the softened region of the glass sheet to form a slit region. The slit extends at least partially into a thickness of the glass sheet. Heat is preferentially applied to the slit region of the glass sheet.

In another embodiment, an apparatus comprises a first heating unit advanceable along a path on a glass sheet to form a softened region. The apparatus further comprises a shearing unit positioned adjacent to the first heating unit and advanceable along the path to form a slit in the softened region to form a slit region. The apparatus further comprises a second heating unit positioned adjacent to the shearing unit and advanceable along the path to apply heat to the slit region.

In another embodiment, a system comprises a laminated glass sheet comprising a core layer disposed between a first cladding layer and a second cladding layer. A first heating unit is configured to heat a region of the glass sheet preferentially to form a softened region. A shearing unit is configured to form a slit in the softened region. At least a portion of the first cladding layer is urged toward the second cladding layer. A second heating unit is configured to apply heat preferentially to the slit formed in the softened region.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a cross sectional view of one exemplary embodiment of a laminated glass sheet.

FIG. 3 is a cross sectional view of one exemplary embodiment of a laminate overflow distributor apparatus for producing a laminated glass sheet.

DETAILED DESCRIPTION

Figure 1:
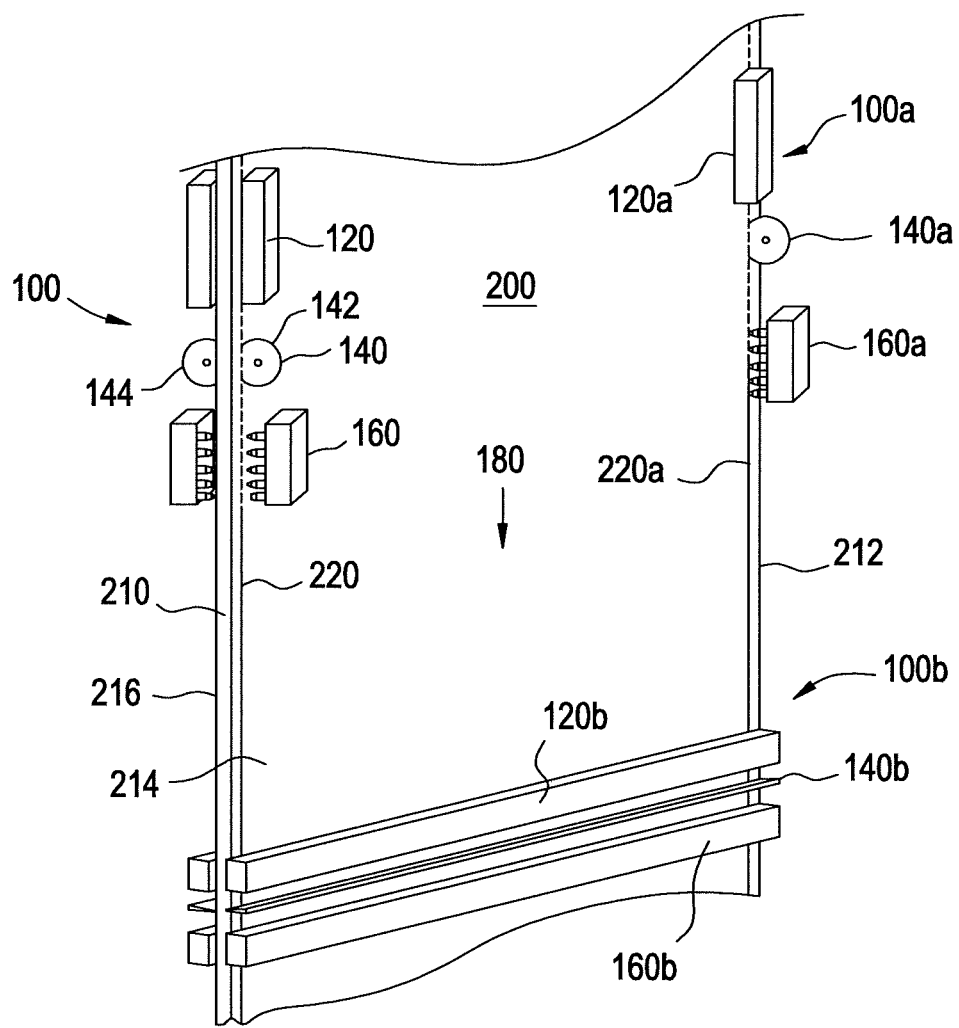
FIG. 1 is a perspective view of one exemplary embodiment of an apparatus for severing a glass sheet.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

FIG. 1 shows one exemplary embodiment of an apparatus 100 for severing a glass sheet. The apparatus 100 comprises a first heating unit 120, a shearing unit 140, and a second heating unit 160. In some embodiments, the first heating unit 120, the shearing unit 140, and the second heating unit 160 are structured and arranged to sever the glass sheet along a determined path extending along the glass sheet as further described below. The glass sheet can have any suitable configuration and can be formed using any suitable process (e.g., fusion-draw, down-draw, slot-draw, up-draw, or float). In some embodiments, the glass sheet is formed using a fusion-draw process, for example, as described below with reference to FIGS. 2-3. In any of the embodiments described herein, the glass sheet can be substantially planar (e.g., a flat glass sheet) or non-planar (e.g., a curved or formed glass sheet).

FIG. 2 is a cross sectional view of one exemplary embodiment of a laminated glass sheet 200. The apparatus 100 can be used to sever a glass sheet such as, for example, the laminated glass sheet 200 as further described below. In some embodiments, the laminated glass sheet 200 comprises a core layer 202 disposed between a first cladding layer 204 and a second cladding layer 206. The first cladding layer 204 and the second cladding layer 206 are exterior layers as shown in FIG. 2. The core layer 202 comprises a first major surface and a second major surface opposite the first major surface. In some embodiments, the first cladding layer 204 is fused to the first major surface of the core layer 202. Additionally, or alternatively, the second cladding layer 206 is fused to the second major surface of the core layer 202. In some of such embodiments, the interface between the first cladding layer 204 and the core layer 202 and/or between the second cladding layer 206 and the core layer 202 is free of any bonding material such as, for example, an adhesive, a coating layer, or any other material added or configured to adhere the respective cladding layer to the core layer. In this manner, one or both of the cladding layers 204 and 206 is fused directly to the core layer 202. The first cladding layer 204 and the second cladding layer 206 are directly adjacent to the core layer 202.

Although the laminated glass sheet 200 is shown as having three layers, other embodiments are included in this disclosure. In other embodiments, a laminated glass sheet can have any suitable number of layers, such as two, four, or more layers. In embodiments in which the laminated glass sheet has more than three layers, one or more intermediate layers are disposed between the core layer and one of the cladding layers. Thus, the cladding layers are exterior layers regardless of the total number of layers included in the laminated glass sheet.

In some embodiments, the laminated glass sheet 200 is configured as a strengthened glass sheet. In some embodiments, for example, the cladding layers 204 and 206 are formed from a glass composition having a different average coefficient of thermal expansion (CTE) than the core layer 202. For example, in some of such embodiments, the cladding layers 204 and 206 are formed from a glass composition having a lower CTE than the core layer 202. The mismatched CTE (i.e., the difference between the CTE of the cladding layers 204 and 206 and the CTE of the core layer 202) results in formation of compressive stress in the cladding layers and/or tensile stress in the core layer upon cooling of the laminated glass sheet 200. In some embodiments, the tensile stress in the core layer 202 is, for example, at least about 30 MPa, at least about 65 MPa, or at least about 100 MPa.

Although the cladding layers 204 and 206 are described herein as being formed from the same glass composition and having a lower CTE than the core layer 202, other embodiments are included in this disclosure. In other embodiments, the cladding layers can be formed from the same or different glass compositions, and each cladding layer, independently, can have a higher CTE or a lower CTE than the core layer.

FIG. 3 illustrates one exemplary embodiment of a laminate overflow distributor apparatus 300 that can be used to form a laminated glass sheet such as, for example, the laminated glass sheet 200. The apparatus 300 is configured generally as described in U.S. Pat. No. 4,214,886, which is incorporated herein by reference in its entirety. The apparatus 300 comprises an upper overflow distributor 320 positioned above a lower overflow distributor 340. The upper overflow distributor 320 comprises a trough 322. A first glass composition 324 is melted and fed into the trough 322 in a viscous state. The first glass composition 324 forms the cladding layers 204 and 206 of the laminated glass sheet 200 as further described below. The lower overflow distributor 340 comprises a trough 342. A second glass composition 344 is melted and fed into the trough 342 in a viscous state. The second glass composition 344 forms the core layer 202 of the laminated glass sheet 200 as further described below.

The second glass composition 344 overflows the trough 342 and flows down opposing outer forming surfaces 346 and 348 of the lower overflow distributor 340. The outer forming surfaces 346 and 348 converge at a draw line 350. The separate streams of the second glass composition 344 flowing down the respective outer forming surfaces 346 and 348 of the lower overflow distributor 340 converge at the draw line 350 where they are fused together to form the core layer 202 of the laminated glass sheet 200.

The first glass composition 324 overflows the trough 322 and flows down opposing outer forming surfaces 326 and 328 of the upper overflow distributor 320. The first glass composition 324 is deflected outward by the upper overflow distributor 320 such that the first glass composition flows around the lower overflow distributor 340 and contacts the second glass composition 344 flowing over the outer forming surfaces 346 and 348 of the lower overflow distributor. The separate streams of the first glass composition 324 are fused to the respective separate streams of the second glass composition 344 flowing down the respective outer forming surfaces 346 and 348 of the lower overflow distributor 340. Upon convergence of the streams of the second glass composition 344 at the draw line 350, the first glass composition 324 forms the cladding layers 204 and 206 of the laminated glass sheet 200.

In some embodiments, the laminated glass sheet 200 is in the form of a glass ribbon traveling away from the draw line 350 of the lower overflow distributor 340 as shown in FIG. 3. The laminated glass sheet 200 cools as it travels away from the lower overflow distributor 340. In some embodiments, the first glass composition 324 has a different CTE than the second glass composition 344 as described above such that, upon cooling of the laminated glass sheet 200, compressive stress is created in the cladding layers 204 and 206 and tensile stress is created in the core layer 202. In this manner, the laminated glass sheet 200 is configured as a strengthened glass sheet.

Returning to FIG. 1, in some embodiments, the laminated glass sheet 200 traveling away from the lower overflow distributor 340 comprises a bead extending along one or both of opposing side edges 210 and 212 thereof. The bead is a portion of the laminated glass sheet 200 having a greater thickness than a central portion of the laminated glass sheet. It may be desirable to separate the bead from the central portion of the laminated glass sheet 200 disposed between the side edges 210 and 212. To that end, in some embodiments, the apparatus 100 is arranged to remove the bead from the side edge 210 of the laminated glass sheet as shown in FIG. 1 and further described below.

The apparatus 100 is configured to sever the laminated glass sheet 200 along a path 220 extending along the laminated glass sheet. In some embodiments, the path 220 extends longitudinally along the length of the laminated glass sheet 200 adjacent to the side edge 210 as shown in FIG. 1. In some of such embodiments, the path 220 is substantially parallel to the side edge 210. Severing the laminated glass sheet 200 along the path 220 can enable separation of the bead from the central portion of the laminated glass sheet. In other embodiments, the path can extend along the laminated glass sheet at any other location and in any other pattern. In this manner, the laminated glass sheet can be cut to any desired size and/or shape.

The first heating unit 120 is configured to selectively or preferentially heat a region of the laminated glass sheet 200 disposed along the path 220 to form a heated region. In some embodiments, the first heating unit 120 is configured to move relative to the laminated glass sheet 200 to advance along the path 220. Such movement can be caused by maintaining the first heating unit 120 in a stationary position while moving the laminated glass sheet 200, by maintaining the laminated glass sheet in a stationary position while moving the first heating unit, or by moving both the first heating unit and the laminated glass sheet. For example, in some embodiments, the first heating unit 120 remains stationary while the laminated glass sheet 200 moves relative to the first heating unit in a traveling direction 180 (e.g., away from the lower overflow distributor 340) as shown in FIG. 1. As the laminated glass sheet 200 moves relative to the first heating unit 120, the first heating unit advances along the path 220. The region of the laminated glass sheet 200 is heated progressively along the path 220 as the first heating unit 120 advances along the path.

In some embodiments, preferentially heating the region of the laminated glass sheet 200 comprises heating the region of the laminated glass sheet including the path 220 and portions of the laminated glass sheet a determined distance to either side of the path with the first heating unit 120 without substantially heating a remote region of the glass sheet disposed away from the path. In this manner, the heated region of the laminated glass sheet 200 has a predetermined width that is less than the width of the laminated glass sheet. In some embodiments, the predetermined width of the heated region is, for example, from about 1% to about 25% of the width of the laminated glass sheet, or from about 1% to about 10% of the width of the laminated glass sheet. In some embodiments, the width of the heated region depends on the temperature of the remote region of the glass sheet disposed away from the path. For example, in some of such embodiments, the width of the heated region is inversely proportional to the temperature of the remote region. In this manner, the heated region is wider when the temperature of the remote region is lower. This can aid in controlling the temperature gradient between the remote region and the heated region to avoid breaking the glass sheet. The heated region has a shape corresponding to the shape of the path 220. For example, in some embodiments, the heated region is a substantially straight line extending longitudinally along the length of the laminated glass sheet as shown in FIG. 1. In other embodiments, the heated region is curved as further described below with reference to FIG. 9.

In some embodiments, the first heating unit 120 is configured to heat the region of the laminated glass sheet 200 to at least a softening temperature of the laminated glass sheet. In this manner, the heated region comprises a softened region. The softening temperature is a temperature at which a small diameter fiber of a glass composition will elongate under its own weight. One suitable method for determining the softening temperature is that described in ASTM C338. In some embodiments, the softening temperature of the laminated glass sheet 200 is the higher of the softening temperature of the glass composition of the core layer 202 and the softening temperature of the glass composition of the cladding layers 204 and 206. In some embodiments, the heated region of the laminated glass sheet 200 is maintained at or above the softening temperature. This can aid in severing the laminated glass sheet with the shearing unit 140 and/or the second heating unit 160 as further described below.

In some embodiments, the first heating unit 120 is configured to heat the region of the laminated glass sheet 200 in a substantially uniform manner across the thickness of the laminated glass sheet. In this manner, the temperature gradient across the thickness of the laminated glass sheet 200 is minimized. This can aid in avoiding the formation of stress across the thickness of the laminated glass sheet 200, which can cause the laminated glass sheet to break (e.g., due to the stress formed therein) as opposed to being sheared by the shearing unit as further described below. Breaking, as opposed to shearing, the laminated glass sheet 200 can cause the core layer 202 to be exposed (e.g., because the cladding layers 204 and 206 may not be wrapped around the core layer at the broken edge).

In some embodiments, the laminated glass sheet 200 is heated to a temperature ranging from the softening temperature to an upper temperature limit. The upper temperature limit ranges, for example, from about 100% to about 110% of the softening temperature. In some embodiments, the upper temperature limit depends on the slope of the viscosity curve (i.e., a plot of temperature vs. viscosity) of the glass composition (e.g., the glass composition of the core layer 202 and/or the glass composition of the cladding layers 204 and 206) between the annealing temperature and the softening temperature. For example, in some embodiments, the upper temperature limit is proportional to the average slope of the viscosity curve of the glass composition between the annealing temperature and the softening temperature. If the region is heated to a temperature below the softening temperature, the glass sheet 200 may break as opposed to being sheared upon engagement by the shearing unit 140 as described below. If the region is heated to a temperature above the upper temperature limit, the cladding layers 204 and 206 may not be sufficiently rigid to be urged together to envelope the core layer 202 as described below. In other words, the cladding layers 204 and 206 may be too soft to be wrapped around the core layer 202.

Upon being heated to at least the softening temperature, the heated region of the laminated glass sheet 200 is sufficiently malleable to be sheared as further described below. In some embodiments, upon heating the region of the laminated glass sheet 200 to at least the softening temperature, the remote region of the laminated glass sheet disposed away from the path remains below the softening temperature of the laminated glass sheet. In some embodiments, upon heating the region of the laminated glass sheet 200 to at least the softening temperature, the remote region of the laminated glass sheet disposed away from the path remains below an annealing temperature of the laminated glass sheet. Alternatively, in other embodiments, the temperature of the remote region of the laminated glass sheet is above the annealing temperature upon heating the region of the laminated glass sheet to at least the softening temperature.

The first heating unit 120 can be configured as any type of heating unit capable of raising the temperature of at least a portion of the laminated glass sheet 200 to at least the softening temperature. For example, the first heating unit 120 can comprise a torch, an infrared heater, an induction heater, a resistance heater, a radiant heater, a laser, or any other suitable heating member. In some embodiments, the first heating unit 120 is positioned adjacent to a first outer surface 214 and/or a second outer surface 216 of the laminated glass sheet 200. For example, in some embodiments, the first heating unit 120 comprises two heating members positioned adjacent to opposing outer surfaces 214 and 216 of the laminated glass sheet as shown in FIG. 1. In this manner, the laminated glass sheet 200 passes between the opposing heating members of the first heating unit 120. This may enable uniform heating of the region of the laminated glass sheet 200 (e.g., by heating the laminated glass sheet from both outer surfaces).

The shearing unit 140 is configured to form a slit in the heated region or softened region of the laminated glass sheet 200 disposed along the path 220 to form a slit region. In some embodiments, the shearing unit 140 is configured to move relative to the laminated glass sheet 200 to advance along the path 220. Such movement can be caused by maintaining the shearing unit 140 in a stationary position while moving the laminated glass sheet 200, by maintaining the laminated glass sheet in a stationary position while moving the shearing unit, or by moving both the shearing unit and the laminated glass sheet. In some embodiments, the shearing unit 140 remains stationary while the laminated glass sheet 200 moves relative to the shearing unit in the traveling direction 180 as shown in FIG. 1. As the laminated glass sheet 200 moves relative to the shearing unit 140, the shearing unit advances along the path 220. The heated region of the laminated glass sheet 200 is slit progressively along the path 220 as the shearing unit 140 advances along the path.

In some embodiments, the shearing unit 140 is configured to at least partially sever the first cladding layer 204 and urge an edge of the severed first cladding layer toward the second cladding layer 206. Additionally, or alternatively, the shearing unit 140 is configured to at least partially sever the second cladding layer 206 and urge an edge of the severed second cladding layer toward the first cladding layer 204. By urging the cladding layers 204 and 206 together, the shearing unit can aid in wrapping the cladding layers around the core layer at the slit. This can aid in preventing the core layer 202 from being exposed at a severed edge of a glass article after the laminated glass sheet 200 is severed to form the glass article. In other words, this can aid in providing a glass article in which the core layer 200 is substantially entirely enveloped within a shell formed by the cladding layers 204 and 206. In some embodiments, because the core layer 202 is under tension, exposure of the core layer can result in fracture of the laminated glass sheet 200. Therefore, ensuring that the core layer 202 is enveloped within the shell formed by the cladding layers 204 and 206 can aid in producing a more robust glass article.

In some embodiments, the shearing unit 140 comprises a first shearing member 142 and a second shearing member 144 as shown in FIG. 1. In some of such embodiments, the first shearing member 142 is positioned adjacent to the first outer surface 214 of the laminated glass sheet 200. Additionally, or alternatively, the second shearing member 144 is positioned adjacent to the second outer surface 216 of the laminated glass sheet 200. In this manner, the laminated glass sheet 200 passes between the shearing members 142 and 144. In some embodiments, the distance between the shearing members 142 and 144 is adjustable to accommodate glass sheets having different thicknesses.

Figure 4:
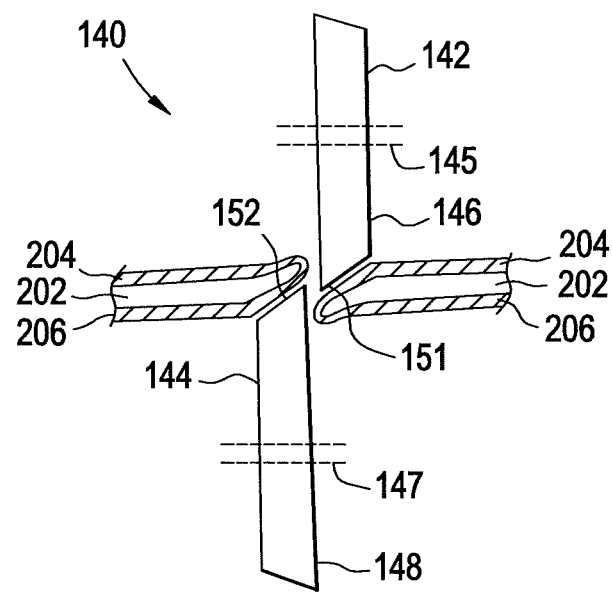
FIG. 4 is an elevation view of one exemplary embodiment of a shearing unit.

FIG. 4 illustrates one exemplary embodiment of the shearing unit 140. The first shearing member 142 is configured as a rotating disc. To that end, the first shearing member 142 comprises a shaft portion 145 and a disc portion 146. In some embodiments, the disc portion 146 is rotatable relative to the shaft portion 145. In some of such embodiments, the disc portion 146 is freely rotatable relative to the shaft portion 145 (e.g., due to movement of the laminated glass sheet 200 relative to the shearing member 140). Alternatively, in other embodiments, the disc portion 146 is driven (e.g., by an electric motor) to rotate relative to the shaft portion 145. The second shearing member 144 is configured as a rotating disc. To that end, the second shearing member 144 comprises a shaft portion 147 and a disc portion 148. In some embodiments, the disc portion 148 is rotatable relative to the shaft portion 147. The disc portion 148 can rotate freely relative to the shaft portion 147 or can be driven to rotate relative to the shaft portion.

In some embodiments, the first shearing member 142 comprises a shearing tip region 151 and/or the second shearing member 144 comprises a shearing tip region 152. The shearing tip regions 151 and 152 extend circumferentially around the respective disc portion 146 and 148 of the respective shearing member 142 and 144. In this manner, the peripheries of the disc portions 146 and 148 are configured as shearing tips. The shearing tip regions 151 and 152 are configured to cut into the heated region of the laminated glass sheet 200 to form the slit therein. For example, in some embodiments, the shearing tip region 151 of the first shearing member 142 cuts into the first cladding layer 204 of the laminated glass sheet 200 from the first surface 214. Additionally, or alternatively, the shearing tip region 152 of the second shearing member 144 cuts into the second cladding layer 206 of the laminated glass sheet 200 from the second surface 216. In some embodiments, the shearing tip regions 151 and 152 can be blunted. This can aid in pulling the cladding layers 204 and 206 toward one another as the shearing tip regions 151 and 152 cut into the laminated glass sheet 200. Alternatively, in other embodiments, the shearing tip regions can be sharpened. This can aid in precisely slicing into the laminated glass sheet 200, but may be less effective at pulling the cladding layers 204 and 206 toward one another to wrap the cladding layers around the core layer 202.

In some embodiments, the shearing members 142 and 144 are positioned relative to one another such that the shearing tip regions 151 and 152 are offset. For example, in some of such embodiments, the shearing tip regions 151 and 152 are offset in the traveling direction 180 as shown in FIG. 4. In this manner, the first shearing member 142 and the second shearing member 144 cut into the laminated glass sheet 200 at different transverse positions along the width of the laminated glass sheet. This can aid in enveloping the core layer 202 within the shell formed by the cladding layers 204 and 206. For example, if the shearing tip regions of the shearing members were aligned in the traveling direction, the shearing unit may form a straight cut through the laminated glass sheet, leaving the core layer exposed at the severed edge. However, the offset shearing tip regions 151 and 152 of the shearing members 142 and 144 cause the severed edges of the cladding layers 204 and 206 to move toward one another to wrap the cladding layers around the core layer 202 as shown in FIG. 4. In some embodiments, end portions of the cladding layers 204 and 206 near the severed edge are thinned as the cladding layers are pulled around the core layer 202. In other words, the cladding layers 204 and 206 are stretched while being pulled around the core layer such that the thickness of the end portions of the cladding layers is reduced. In this manner, the shell formed by the cladding layers 204 and 206 comprises an end portion that is adjacent to the severed edge of the laminated glass sheet 200 and thinner than the remainder of the shell spaced away from the severed edge as shown in FIG. 4.

Figure 5:
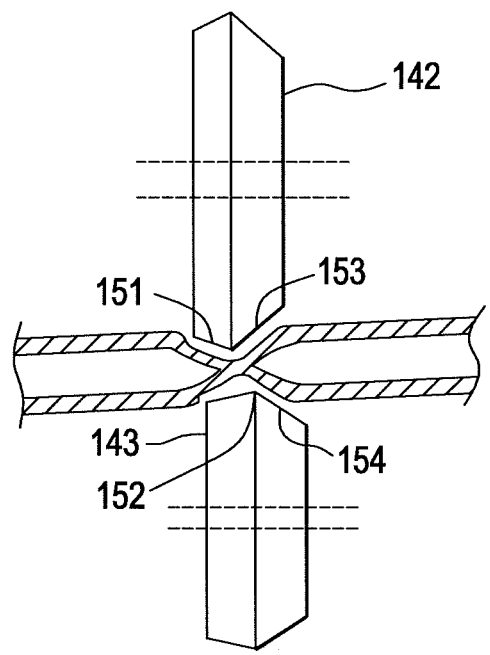
FIG. 5 is an elevation view of another exemplary embodiment of a shearing unit.

FIG. 5 shows another exemplary embodiment of the shearing members 142 and 144. In some embodiments, the first shearing member 142 comprises a contoured region 153 positioned adjacent to the shearing tip region 151. Additionally, or alternatively, the second shearing member 144 comprises a contoured region 154 positioned adjacent to the shearing tip region 152. The contoured regions 153 and 154 are positioned opposite one another and configured to shape the severed edge of the laminated glass sheet 200. For example, the contoured regions 153 and 154 shown in FIG. 5 are configured as substantially straight tapered regions. The contoured regions 153 and 154 are tapered in opposite directions such that the space between the contoured regions has a substantially triangular shape. Upon passage of the laminated glass sheet 200 between the shearing members, the severed edge of the laminated glass sheet takes on a beveled shape corresponding to the shapes of the contoured regions 153 and 154 of the shearing members 142 and 144. In some embodiments, the shell formed by the cladding layers 204 and 206 comprises a thinned end portion as described above with reference to FIG. 4.

Figure 6:
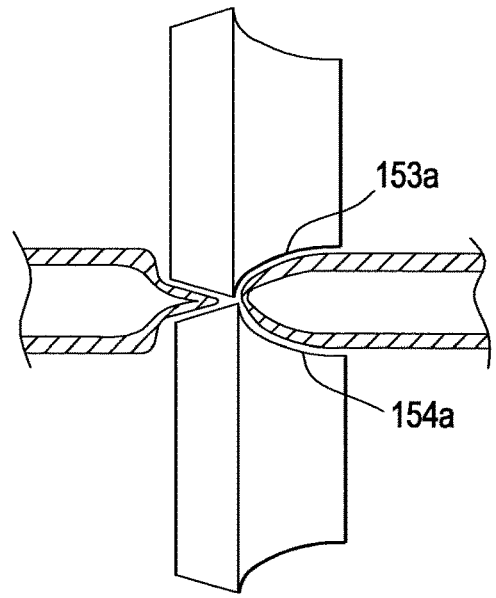
FIG. 6 is a close-up view of one exemplary embodiment of a tip configuration of a shearing unit.

The contoured regions can have any suitable shape configured to form a desired shape at the severed edge of the laminated glass sheet. For example, FIG. 6 shows one exemplary embodiment of shearing members having contoured regions 153a and 154a. Each of the contoured regions 153a and 154a comprises a curved taper. The contoured regions 153a and 154a are curved in opposite directions such that the space between the contoured regions has a substantially semi-elliptical shape. Upon passage of the laminated glass sheet 200 between the shearing members, the severed edge of the laminated glass sheet takes on a semi-elliptical shape corresponding to the shapes of the contoured regions 153a and 154a. In this manner, the severed edge of the laminated glass sheet 200 is given a rounded or bullnose shape. In some embodiments, the shell formed by the cladding layers 204 and 206 comprises a thinned end portion as described above with reference to FIG. 4.

Figure 7:
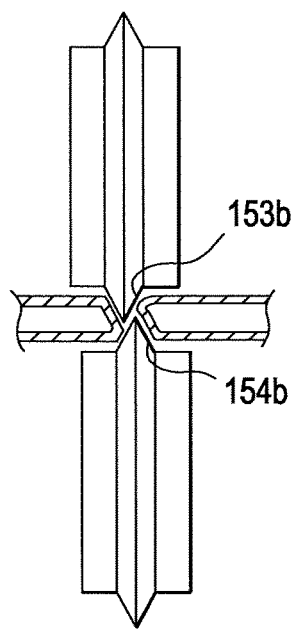
FIG. 7 is a close-up view of another exemplary embodiment of a tip configuration of a shearing unit.

FIG. 7 shows one exemplary embodiment of shearing members having contoured regions 153b and 154b. Each of the contoured regions 153b and 154b comprises a tapered portion and a flat portion adjacent to the tapered portion. Upon passage of the laminated glass sheet 200 between the shearing members, the severed edge of the laminated glass sheet takes on a beveled shape corresponding to the shapes of the contoured regions 153b and 154b. In some embodiments, the bevel formed by the contoured regions 153b and 154b shown in FIG. 7 is somewhat steeper than the bevel formed by the contoured regions 153 and 154 shown in FIG. 5. In some embodiments, such a steeper taper as shown in FIG. 7 is suitable for use with a relatively thin laminated glass sheet (e.g., a laminated glass sheet having a thickness of at most about 1 mm). In some embodiments, the shell formed by the cladding layers 204 and 206 comprises a thinned end portion as described above with reference to FIG. 4.

Figure 8:
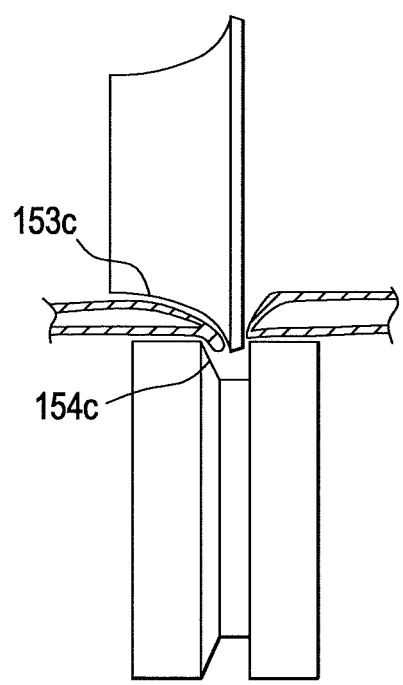
FIG. 8 is a close-up view of another exemplary embodiment of a tip configuration of a shearing unit.

FIG. 8 shows one exemplary embodiment of shearing members having contoured regions 153c and 154c. The contoured region 153c comprises a curved taper. The contoured region 154c comprises a tapered notch. The curved taper is configured to fit within the tapered notch as shown in FIG. 8. Upon passage of the laminated glass sheet 200 between the shearing members, the severed edge of the laminated glass sheet comprises a lip corresponding to the shape of the space between the contoured regions 153c and 154c. In some embodiments, the shell formed by the cladding layers 204 and 206 comprises a thinned end portion as described above with reference to FIG. 4.

In some embodiments, the shearing unit 140 severs each of the first cladding layer 204, the second cladding layer 206, and the core layer 202. In this manner, the slit formed in the laminated glass sheet 200 extends entirely through the thickness of the laminated glass sheet (e.g., as shown in FIG. 4). In other words, the laminated glass sheet 200 is severed by the shearing unit 140. Alternatively, in other embodiments, the slit formed in the laminated glass sheet 200 extends through only a portion of the thickness of the laminated glass sheet (e.g., as shown in FIG. 5). In some of such embodiments, upon forming the slit in the laminated glass sheet 200, the shearing unit 140 leaves one or more of the first cladding layer 204, the second cladding layer 206, or the core layer 202 at least partially unsevered. A first portion of the laminated glass sheet 200 is positioned on a first side of the slit. A second portion of the laminated glass sheet 200 is positioned on a second side of the slit opposite the first portion. In some embodiments, upon formation of the slit in the laminated glass sheet 200, the first portion of the laminated glass sheet and the second portion of the laminated glass sheet remain attached to one another by a membrane of glass material. The membrane of glass material is thinner than the laminated glass sheet 200. In other words, the shearing unit 140 partially severs the laminated glass sheet 200 such that the slit does not extend entirely through the thickness of the laminated glass sheet. In this manner, the slit region of the laminated glass sheet 200 is a thinned region having a reduced thickness relative to the remainder of the laminated glass sheet. The membrane can comprise at least a portion of the first cladding layer 204, the second cladding layer 206, and/or the core layer 202. In some embodiments, the membrane is severed (e.g., by the second heating unit 160) to sever the glass sheet as further described below.

In some embodiments, upon formation of the slit in the laminated glass sheet 200, the cladding layers 204 and 206 move toward one another as described above. The first cladding layer 204 is brought into close proximity to the second cladding layer 206 (e.g., at an edge of the slit) during formation of the slit. Additionally, or alternatively, the second cladding layer 206 is brought into close proximity to the first cladding layer 204 (e.g., at an edge of the slit) during formation of the slit. In some embodiments, the laminated glass sheet 200 is squeezed between the shearing members 142 and 144 such that the cladding layers 204 and 206 move around the core layer 202 and toward one another. In some embodiments, the first cladding layer 204 and the second cladding layer 206 move into contact with one another during formation of the slit in the laminated glass sheet 200. The cladding layers 204 and 206 can be brought into contact with one another regardless of whether the portions of the laminated glass sheet 200 disposed on opposing sides of the slit remain attached to one another by the membrane after formation of the slit. In other words, the cladding layers 204 and 206 can be brought into contact with one another regardless of whether the laminated glass sheet 200 is severed during formation of the slit.

Although the shearing unit 140 has been described above as comprising two shearing members configured as rotating discs, other embodiments are included within this disclosure. In other embodiments, the shearing unit can comprise any number of shearing members (e.g., one, three, or more) having any suitable configuration. For example, in some embodiments, the shearing members are configured as one or more blades or tines positioned to contact the laminated glass sheet 200. In some of such embodiments, the blades or tines are configured as elongate members positioned to engage the laminated glass sheet. The blades or tines comprise shearing tip regions and/or contoured regions as described above. The shearing tip regions of the blades or tines are offset relative to one another also as described above.

Returning to FIG. 1, the second heating unit 160 is configured to selectively or preferentially apply heat to the slit region of the laminated glass sheet 200 disposed along the path 220. In some embodiments, the second heating unit 160 is configured to move relative to the laminated glass sheet 200 to advance along the path 220. Such movement can be caused by maintaining the second heating unit 160 in a stationary position while moving the laminated glass sheet 200, by maintaining the laminated glass sheet in a stationary position while moving the second heating unit, or by moving both the second heating unit and the laminated glass sheet. In some embodiments, the second heating unit 160 remains stationary while the laminated glass sheet 200 moves relative to the second heating unit in the traveling direction 180 as shown in FIG. 1. As the laminated glass sheet 200 moves relative to the second heating unit 160, the second heating unit advances along the path 220. Heat is progressively applied to the slit formed in the laminated glass sheet 200 as the second heating unit 160 advances along the path 220.

In some embodiments in which the laminated glass sheet 200 is not severed upon formation of the slit as described above, application of heat to the slit region severs the laminated glass sheet. For example, in some embodiments, application of heat to the slit region severs the membrane of glass material extending between the first and second portions of the laminated glass sheet 200 to sever the laminated glass sheet.

Upon severing the laminated glass sheet 200 (e.g., by the shearing unit 140 or the second heating unit 160), the laminated glass sheet comprises a severed edge. In some embodiments, the second heating unit 160 applies heat to the severed edge of the laminated glass sheet 200. This can aid in polishing the severed edge of the laminated glass sheet 200 and/or repairing defects in the severed edge of the laminated glass sheet that may have been formed during the severing process. To that end, in some embodiments, the second heating unit 160 comprises a torch configured to expose the severed edge of the laminated glass sheet 200 to a flame. In this manner, the second heating unit 160 flame polishes the severed edge of the laminated glass sheet 200. This can aid in smoothing the severed edge and/or repairing cracks or other defects that may have been formed upon severing the laminated glass sheet 200. This also can aid in securely fusing the cladding layers 204 and 206 to one another so that the core layer 202 remains unexposed at the severed edge of the laminated glass sheet 200.

The second heating unit 160 can be configured as any type of heating unit capable of heating the laminated glass sheet 200. For example, the second heating unit 160 can comprise any suitable heating member as described above with reference to the first heating unit 120. In some embodiments, the second heating unit 160 is positioned adjacent to the first outer surface 214 and/or the second outer surface 216 of the laminated glass sheet 200. For example, in some embodiments, the second heating unit 160 comprises two heating members positioned adjacent to opposing outer surfaces 214 and 216 of the laminated glass sheet as shown in FIG. 1. In this manner, the laminated glass sheet 200 passes between the opposing heating members of the second heating unit 160. This can enable heat to be applied uniformly to the slit region of the laminated glass sheet 200 (e.g., by heating from both outer surfaces).

In some embodiments, the first heating unit 120, the shearing unit 140, and the second heating unit 160 are aligned with one another in the traveling direction 180 as shown in FIG. 1. The first heating unit 120, the shearing unit 140, and the second heating unit 160 are aligned with the path 220 extending longitudinally along the length of the laminated glass sheet 200 adjacent to the side edge 210. In some embodiments, the first heating unit 120, the shearing unit 140, and the second heating unit 160 are maintained in a fixed position relative to the apparatus used to form the laminated glass sheet 200 (e.g., the laminate overflow distributor apparatus 300). For example, in some embodiments, the first heating unit 120, the shearing unit 140, and the second heating unit 160 are mounted on a frame or support structure to maintain the positions thereof. The laminated glass sheet 200 is moved in the traveling direction 180 relative to the apparatus 100. In this manner, the first heating unit 120, the shearing unit 140, and the second heating unit 160 are sequentially advanced along the path 220 to sever the laminated glass sheet progressively along the path. In some embodiments, this enables the bead extending along the side edge 210 to be separated from the laminated glass sheet 200. The laminated glass sheet 200 is severed and/or the bead is separated in a continuous manner (e.g., as the laminated glass sheet travels away from the lower overflow distributor 340).

In some embodiments, the laminated glass sheet 200 cools while traveling away from the overflow distributor apparatus 300 as described above. In some embodiments, the apparatus 100 is positioned a sufficient distance downstream of the overflow distributor apparatus 300 that the region of the laminated glass sheet 200 is below the softening temperature of the laminated glass sheet prior to being reheated by the first heating unit 120. In this manner, the laminated glass sheet 200 is allowed to set prior to engagement by the apparatus 100. In this manner, the remote region of the laminated glass sheet 200 is at least somewhat rigid and/or brittle upon severing the region of the laminated glass sheet. The stability provided by the remote region of the laminated glass sheet 200 can aid in precisely severing the laminated glass sheet at the region engaged by the apparatus 100 as described herein.

Although the apparatus 100 has been described in connection with severing the laminated glass sheet 200, other embodiments are included in this disclosure. The apparatus 100 can be used to sever any type of glass sheet. The glass sheet can be laminated or non-laminated. In other words, the glass sheet can include a single layer of glass or multiple layers of glass. The glass sheet can be formed using any suitable process (e.g., fusion-draw, down-draw, slot-draw, up-draw, or float). The glass sheet can be strengthened or non-strengthened. The glass sheet can be strengthened in any suitable manner (e.g., CTE mismatch or ion exchange).

In some embodiments, a second apparatus 100a is positioned along a second path 220a adjacent to the side edge 212 of the laminated glass sheet 200 as shown in FIG. 1. The second apparatus 100a is configured generally as described above with reference to the apparatus 100. For example, in some embodiments, the second apparatus comprises a first heating unit 120a, a shearing unit 140a, and a second heating unit 160a. The second apparatus 100a is configured to sever the laminated glass sheet 200 to separate the bead from the side edge 212. In some embodiments, both the first apparatus 100 and the second apparatus 100a are employed to remove the beads from both edges of the laminated glass sheet 200 to leave the central portion free of the beads. In this manner, the beads are removed continuously during production of the laminated glass sheet 200.

In some embodiments, a third apparatus 100b is positioned adjacent to the laminated glass sheet 200 downstream of the apparatus 100 and/or the second apparatus 100a as shown in FIG. 1. The third apparatus 100b is similar to the apparatus 100. For example, in some embodiments, the third apparatus comprises a first heating unit 120b, a shearing unit 140b, and a second heating unit 160b. Each of the first heating unit 120b, the shearing unit 140b, and the second heating unit 160b extends along the width of the laminated glass sheet 200. In some embodiments, the third apparatus 100b is configured to sever the laminated glass sheet 200 along a path that is substantially perpendicular to the path 220. In other embodiments, the third apparatus 100b can be configured to sever the laminated glass sheet along a path that is disposed at any angle relative to the path 220.

The first heating unit 120b is configured to selectively or preferentially heat a region of the laminated glass sheet 200 disposed along the path to form a heated region. In some embodiments, the first heating unit 120b extends transversely along substantially the entire width of the central portion of the laminated glass sheet 200. For example, the first heating unit 120b extends along substantially the entire width between the path 220 and the path 220a. In some embodiments, the first heating unit 120b comprises a bank of torches extending along the width of the laminated glass sheet 200.

The shearing unit 140b is configured to form a slit in the heated region or softened region of the laminated glass sheet 200 disposed along the path to form a slit region. In some embodiments, the shearing unit 140b comprises a pair of shearing members as described above with reference to the shearing unit 140. In some of such embodiments, the shearing members are configured to advance along the width of the laminated glass sheet 200 to form the slit in the heated region. For example, in some embodiments, the shearing members are configured to advance in a direction substantially perpendicular to the traveling direction 180 to form the slit in the heated region. In other embodiments, the shearing unit 140b comprises a pair of shearing members each extending transversely along substantially the entire width of the central portion of the laminated glass sheet 200. In some of such embodiments, the shearing members are positioned adjacent to opposing surfaces of the laminated glass sheet 200 with the laminated glass sheet positioned between the shearing members. In some embodiments, each shearing member is configured as an elongate blade having a shearing tip region facing the laminated glass sheet 200. Additionally, or alternatively, each shearing member comprises a contoured region adjacent to the shearing tip region. The shearing members are movable between a retracted position in which the shearing members are disengaged from the laminated glass sheet 200 and an advanced position in which the shearing members are engaged with the laminated glass sheet. In this manner, the shearing members are movable toward one another to engage the laminated glass sheet 200 and form the slit in the heated region.

The second heating unit 160b is configured to selectively or preferentially apply heat to the slit region of the laminated glass sheet 200 disposed along the path. In some embodiments, the second heating unit 160b extends transversely along substantially the entire width of the central portion of the laminated glass sheet 200. For example, the second heating unit 160b extends along substantially the entire width between the path 220 and the path 220a. In some embodiments, the second heating unit 160b is configured as a bank of torches extending along the width of the laminated glass sheet 200.

In some embodiments, the laminated glass sheet 200 is configured as a glass ribbon traveling away from the lower overflow distributor 340 as described above. In some of such embodiments, the third apparatus 100b is configured to travel with the laminated glass sheet 200 to sever the laminated glass sheet along the path. For example, the apparatus 100b is positioned such that the first heating unit 120b is aligned with the path. The apparatus 100b travels with the ribbon to maintain the first heating unit 120b in alignment with the path until the region of the laminated glass sheet 200 is heated to at least the softening temperature. The position of the apparatus 100b is adjusted to align the shearing unit 140b with the heated region extending along the path of the laminated glass sheet 200. The apparatus 100b travels with the ribbon to maintain the shearing unit 140b in alignment with the path until the slit is formed in the heated region of the laminated glass sheet 200. In some embodiments, the slit is formed by advancing the shearing members along the width of the laminated glass sheet 200. In other embodiments, the slit is formed by moving the shearing members toward one another to engage the laminated glass sheet positioned therebetween. The position of the apparatus 100b is adjusted to align the second heating unit 160b with the slit region extending along the path of the laminated glass sheet 200. The apparatus 100b travels with the ribbon to maintain the second heating unit 160b in alignment with the path until sufficient heat has been applied to the slit region of the laminated glass sheet 200 to sever the laminated glass sheet and/or to polish the severed edge of the laminated glass sheet. In some embodiments, the position of the apparatus 100b is readjusted such that the first heating unit 120b is aligned with another path, and the process is repeated to sever the laminated glass sheet 200 along the other path.

In some embodiments, the use of the apparatus 100, the second apparatus 100a, and the third apparatus 100b in combination enables the laminated glass sheet 200, which can be configured as a moving glass ribbon, to be cut to a desired size and shape (e.g., a rectangular shape). In some embodiments, the cladding layers 204 and 206 of the laminated glass sheet 200 are wrapped over the core layer 202 at each of the severed edges. In this manner, the core layer 202 is enveloped within the shell formed by the cladding layers 204 and 206.

Figure 9:
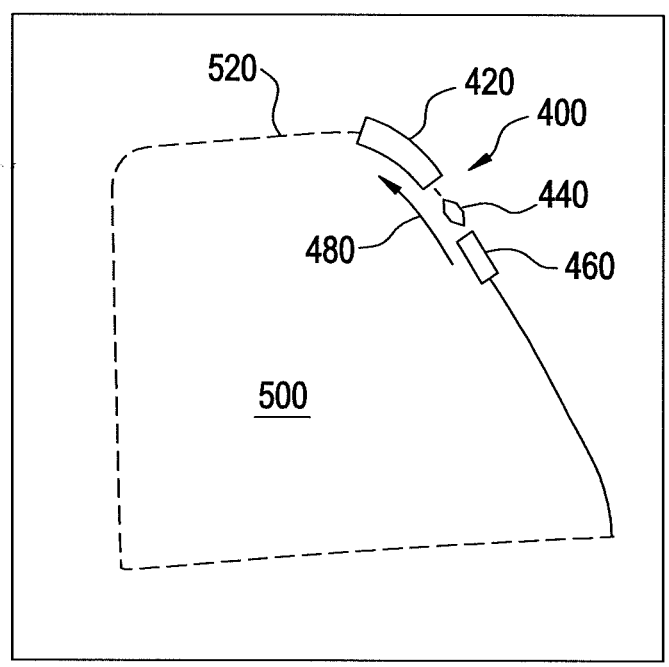
FIG. 9 is an elevation view of another exemplary embodiment of an apparatus for severing a glass sheet.

FIG. 9 shows one exemplary embodiment of an apparatus 400 for severing a glass sheet 500. The glass sheet 500 can be laminated or non-laminated and strengthened or non-strengthened as described above. The apparatus 400 is configured to sever the glass sheet 500 along a path 520 extending along the glass sheet. In some embodiments, the path 520 extends along the glass sheet 500 to form a closed loop as shown in FIG. 9. Severing the glass sheet 500 along the path 520 enables a glass article having the shape of the closed loop to be cut from the glass sheet. In some embodiments, the glass article can be in the shape of an automobile window as shown in FIG. 9. In other embodiments, the path can extend along the laminated glass sheet in any other pattern to form a glass article having any desired shape.

In some embodiments, the apparatus 400 is similar to the apparatus 100 described above. For example, in some embodiments, the apparatus 400 comprises a first heating unit 420, a shearing unit 440, and a second heating unit 460. The first heating unit 420 is configured to selectively or preferentially heat a region of the glass sheet 500 disposed along the path 520 to form a heated region. The shearing unit 440 is configured to form a slit in the heated region or softened region of the glass sheet 500 disposed along the path 520 to form a slit region. The second heating unit 460 is configured to selectively or preferentially apply heat to the slit region of the glass sheet 500 disposed along the path 520.

In some embodiments, the first heating unit 420, the shearing unit 440, and the second heating unit 460 are sequentially advanced along the path 520 by relative movement between the apparatus 400 and the glass sheet 500. For example, in some embodiments, the glass sheet 500 is held stationary, and the apparatus 400 is moved relative to the glass sheet. In some embodiments, the first heating unit 420, the shearing unit 440, and the second heating unit 460 are coupled to one another. For example, in some of such embodiments, the first heating unit 420, the shearing unit 440, and the second heating unit 460 are mounted on a support structure configured to move relative to the glass sheet 500. In this manner, the apparatus 400 is configured to move as a unit along the path 520. In some embodiments, the first heating unit 420, the shearing unit 440, and the second heating unit 460 are aligned with one another in a traveling direction 480. In this manner, the first heating unit 420, the shearing unit 440, and the second heating unit 460 are advanced along the path 520 in succession to sever the glass sheet 500. The traveling direction can be changed as the apparatus 400 is moved to maintain the apparatus in alignment with the path 520. In some embodiments, movement of the apparatus 400 is automated. For example, in some of such embodiments, movement of the apparatus 400 is controlled by a computer numerical control (CNC) machine.

In some embodiments, the path 520 comprises one or more curved portions as shown in FIG. 9. The first heating unit 420, the shearing unit 440, and/or the second heating unit 460 are configured to follow the path 520 along curved portions thereof. For example, in some embodiments, the first heating unit 420 is articulated to enable the first heating unit to conform to the curvature of the path 520 as shown in FIG. 9. In other words, the first heating unit 420 is configured to bend or flex to conform to the curvature of the path 520. In some embodiments, the shearing unit 440 and/or the second heating unit 460 is articulated in a similar manner to conform to the curvature of the path 520.

The apparatuses and method described herein for severing a glass sheet may be beneficial for severing a laminated and/or strengthened glass sheet. Severing such a laminated or strengthened glass sheet using a conventional scoring and bending process may result in breakage of the glass sheet, especially if the glass sheet comprises a core layer with a relatively high tensile stress. Use of conventional scoring and bending processes to sever a laminated glass sheet can leave the core layer exposed at the severed edge, which can reduce the strength or resilience of the glass sheet. In some embodiments, the apparatuses and methods described herein enable severing of a laminated and/or strengthened glass sheet without breakage and without exposing the core layer at the severed edge of the glass sheet. This may enable production of a severed glass sheet that is capable of withstanding exposure to additional processing (e.g., molding into a glass article) and/or handling (e.g., during assembly of a display device including the severed glass sheet) without breaking. The apparatuses and methods described herein can be used to sever a glass sheet online (e.g., during production of the glass sheet) or offline (e.g., as a post-processing step after production of the glass sheet). For example, the apparatuses and methods described herein can be used to sever a hot glass sheet (e.g., at or near the discharge of a laminate overflow distribution apparatus) or a cold glass sheet (e.g., at or near room temperature).

It will be apparent to those skilled in the art that various modifications and variations can be made without departing from the spirit or scope of the invention. Accordingly, the invention is not to be restricted except in light of the attached claims and their equivalents.

What is claimed is:

1. A method for severing a strengthened glass sheet comprising a glass core layer disposed between a first glass cladding layer and a second glass cladding layer, each of the first glass cladding layer and the second glass cladding layer comprising a lower coefficient of thermal expansion than the glass core layer such that the glass core layer comprises a tensile stress, the method comprising:
    preferentially heating a region of the glass sheet to at least a softening temperature of the glass sheet to form a softened region, wherein a remote region of the glass sheet disposed away from the region remains below an annealing temperature of the glass sheet during the preferentially heating;
    forming a slit in the softened region of the glass sheet to form a slit region, the slit extending at least partially into a thickness of the glass sheet; and
    preferentially applying heat to the slit region of the glass sheet.

2. The method of claim 1, wherein the preferentially applying heat to the slit region comprises applying heat sufficient to sever the glass sheet into first and second portions.

3. The method of claim 1, wherein subsequent to the forming the slit in the softened region, a first portion of the glass sheet positioned on a first side of the slit and a second portion of the glass sheet positioned on a second side of the slit opposite the first portion are attached to one another by a membrane that is thinner than the glass sheet; and the preferentially applying heat to the slit region severs the membrane to separate the first portion and the second portion of the glass sheet from one another.

4. The method of claim 1, wherein the forming the slit in the softened region causes at least part of the first glass cladding layer to move toward the second glass cladding layer.

5. The method of claim 4, wherein the forming the slit in the softened region causes the first glass cladding layer and the second glass cladding layer to move into contact with each other.

6. The method of claim 1, wherein the core layer comprises a tension of at least about 30 MPa.

7. The method of claim 1, wherein the forming the slit in the softened region comprises shearing the softened region and moving an edge of the first glass cladding layer and an edge of the second glass cladding layer toward each other.

8. The method of claim 1, wherein:
    the forming the slit in the softened region comprises passing the softened region of the glass sheet between a first shearing member and a second shearing member in a traveling direction; and
    the first shearing member and the second shearing member are misaligned with one another in the traveling direction to urge an edge of the first glass cladding layer adjacent to the slit and an edge of the second glass cladding layer adjacent to the slit toward each other.

9. The method of claim 1, wherein:
    the preferentially heating the region of the glass sheet comprises moving one of a first heating unit and the glass sheet relative to the other;
    the forming the slit in the softened region comprises moving one of a shearing unit and the glass sheet relative to the other; and
    the preferentially applying heat to the slit region comprises moving one of a second heating unit and the glass sheet relative to the other.

10. The method of claim 9, wherein the first heating unit, the shearing unit, and the second heating unit are coupled to one another such that moving the glass sheet relative to the coupled first heating unit, shearing unit, and second heating unit causes the first heating unit, the shearing unit, and the second heating unit to move successively along a path on the glass sheet.

11. The method of claim 9, wherein the first heating unit, the shearing unit, and the second heating unit are aligned with one another in a traveling direction, and the method further comprises moving the glass sheet relative to the first heating unit, the shearing unit, and the second heating unit in the traveling direction to cause the first heating unit, the shearing unit, and the second heating unit to progress successively along a path on the glass sheet.

12. The method of claim 11, wherein the glass sheet comprises a glass ribbon moving continuously relative to the first heating unit, the shearing unit, and the second heating unit in the traveling direction, and the path extends substantially parallel to a side edge of the glass ribbon.

13. The method of claim 1, wherein the preferentially applying heat to the slit region comprises directing a flame toward the slit region of the glass sheet.

14. The method of claim 1, wherein the softening temperature of the glass sheet is the higher of a softening temperature of the core layer and a softening temperature of the first and second cladding layers.

* * * * *